United States Patent [19]
Mascall

[11] 3,847,209
[45] Nov. 12, 1974

[54] TEMPERATURE CONTROLLED SYSTEMS

[75] Inventor: John Robert Mascall, Harrow Weald, England

[73] Assignee: Churchill Instrument Company Limited, Greenford, Middlesex, England

[22] Filed: Mar. 21, 1973

[21] Appl. No.: 343,359

[30] Foreign Application Priority Data
Apr. 21, 1972 Great Britain.................... 18598/72

[52] U.S. Cl...................... 165/14, 165/26, 165/27, 165/30, 165/36, 165/40
[51] Int. Cl.................... F25b 29/00, F28f 1/00
[58] Field of Search............ 165/40, 14, 30, 36, 26, 165/27

[56] References Cited
UNITED STATES PATENTS

| | | | |
|---|---|---|---|
| 2,357,706 | 9/1944 | Toepperwein........................ | 165/40 |
| 2,915,298 | 12/1959 | Hamlin................................ | 165/27 |
| 3,170,508 | 2/1965 | Avery................................... | 165/26 |
| 3,176,759 | 4/1965 | Windham............................. | 165/40 |
| 3,259,175 | 7/1966 | Kraus et al.......................... | 165/12 |
| 3,406,744 | 10/1968 | Scheibler............................ | 165/27 |

Primary Examiner—Manuel A. Antonakas
Assistant Examiner—Daniel J. O'Connor
Attorney, Agent, or Firm—Stevens, Davis, Miller & Mosher

[57] ABSTRACT

A temperature control system which comprises a fluid heating circuit which includes, or is intended to include, a first load; said heating circuit having a first pump, fluid heating means and first control means; said first control means being responsive to the temperature of fluid in the heating circuit, having predetermined maximum and minimum temperature operative conditions and being arranged to actuate the heating means at its minimum temperature operative condition; a fluid cooling circuit which includes, or is intended to include, a second load; said cooling circuit having a second pump, fluid cooling means and second control means; said second control means being responsive to the temperature of fluid in the cooling circuit, having predetermined maximum and minimum temperature operative conditions and being arranged to actuate the cooling means at its maximum temperature operative condition; and wherein the first control means, when at its maximum temperature operative condition, is arranged to actuate normally closed first valve means which when actuated allows fluid to flow from the cooling circuit into the heating circuit, and the second control means, when at its minimum temperature operative condition is arranged to actuate normally closed second valve means which when actuated allows fluid to flow from the heating circuit into the cooling circuit.

11 Claims, 1 Drawing Figure

PATENTED NOV 12 1974　　3,847,209
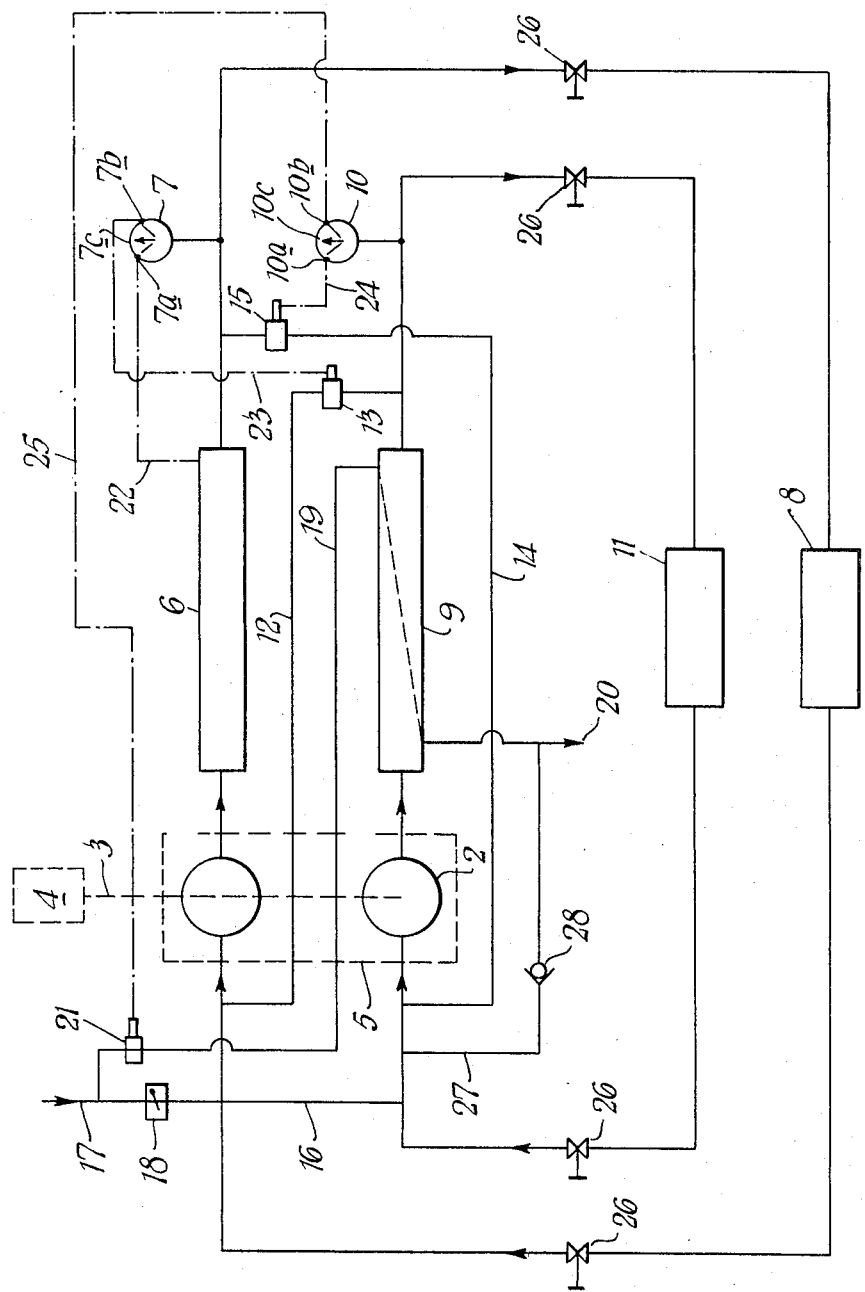

TEMPERATURE CONTROLLED SYSTEMS

This invention relates to a temperature control system. More particularly the invention is concerned with a system for controlling the temperature of fluid which fluid is primarily utilized to temperature control two loads to different temperatures relative to each other.

There are many industrial applications which comprise temperature control systems having two loads which, in operation of the system, are desirably maintained at a different temperature from each other. Generally the loads are heated or cooled by fluid passing through a passage or chamber in them. Examples of such industrial applications are two loads provided by mould halves of an injection moulding machine or by a pair of opposed heated rollers in a calendar machine; in each of these examples one of the rollers or one of the mould halves is preferably maintained at a different temperature to the other for reasons which are well known in the relevant art.

Hitherto the necessary heating or cooling of the two loads to maintain them at relatively different and predetermined temperatures has been achieved, as far as we are aware, by the use of two completely independent temperature control systems (being one system for each load and therefore a relatively expensive arrangement) or at the expense of inefficient utilization of the heat which is put into or taken out of the fluid to control the respective temperatures of the loads to that required. As an example of this latter point, in a previously proposed system a portion of heated fluid from a heater is passed through one load to control its temperature at that required. The remaining portion of the heated fluid is mixed with a supply of relatively colder fluid prior to this mixture passing through a second load to control its temperature at that required (which temperature is less than that of the first load). After leaving the second load the mixture of hot and cold fluids is returned to a pump for the system and any excess volume of fluid which may be present due to the introduction of the colder fluid is passed to a drain. In such a system it will be apparent that a part of the heat output from the heater is lost directly down the drain, thereby wasting part of the energy expended by the heater (which may be electrically or otherwise operated).

By the present invention there is provided a temperature control system which comprises a fluid heating circuit which includes, or is intended to include, a first load; said heating circuit having a first pump, fluid heating means and first control means; said first control means being responsive to the temperature of fluid in the heating circuit, having predetermined maximum and minimum temperature operative conditions and being arranged to actuate the heating means at its minimum temperature operative condition; a fluid cooling circuit which includes, or is intended to include, a second load; said cooling circuit having a second pump, fluid cooling means and second control means; said second control means being responsive to the temperature of fluid in the cooling circuit, having predetermined maximum and minimum temperature operative conditions and being arranged to actuate the cooling means at its maximum temperature operative condition; and wherein the first control means, when at its maximum temperature operative condition, is arranged to actuate normally closed first valve means which when actuated allows fluid to flow from the cooling circuit into the heating circuit, and the second control means, when at its minimum temperature operative condition is arranged to actuate normally closed second valve means which when actuated allows fluid to flow from the heating circuit into the cooling circuit.

By the system of the present invention, the heat output from the heating means or the cooling effect of the cooling means is used respectively to heat or to cool the fluid in both circuits to temperaturs which are predetermined by the first and second control means. However, should one or other of the loads take-in or lose heat (for example as may occur in an injection moulding process if the loads are mould halves which exchange heat with the moulding material) the consequent tendency of the fluid in that circuit to rise or fall in temperature is counteracted, should either or both of the control means attain their respective maximum or minimum temperature operative conditions, by the flow into either or both circuits of relatively colder or hotter fluid which passes from the cooling means or the heating means. Consequently, since the heating means provides heat for both fluid circuits, the cooling means will remove heat from both fluid circuits, and these fluid circuits are substantially self contained, the cooling effect required of the cooling means may primarily be to remove heat which has been put into the fluid circuits from a source other than the heating means, usually through the loads. Conversely the heating effect required of the heating means may primarily be to supply heat which has been taken out of the fluid circuits by a source other than the cooling means, again usually through the loads. This effect of heat energy conservation may be used in the system of the present invention at temperatures above or below ambient.

Preferably the maximum and minimum settings of the first and second control means are adjustable to determine the temperature range which is desired of the fluid in the respective circuits. However, since the cooling circuit can only be heated by transfer of fluid from the heating circuit (neglecting any heat which may be taken into the cooling circuit through its load), the desired temperature at which it is required the second load should be maintained cannot be higher than that of the first load. It is therefore necessary to connect the first circuit to the load which is to operate at the highest temperature.

To ensure efficient transfer of the fluid between circuits when either or both the first and second valve means are actuated, the first valve means should be located in a first transfer passage which, when the first valve means is actuated, communicates between a position of low fluid pressure in the heating circuit and a position of relatively higher fluid pressure in the cooling circuit. Advantageously the first transfer passage communicates between the input side of the first pump in the heating circuit and the output side of the cooling means in the cooling circuit so that the first pump tends to draw fluid into the heating circuit from the cooling circuit. Similarly, the second valve means should be located in a second transfer passage which, when the second valve means is actuated, communicates between a position of low fluid pressure in the cooling circuit and a position of relatively higher fluid pressure in the heating circuit. Advantageously the second transfer passage communicates between the output side of the heating means in the heating circuit and the input side of the second pump in the cooling circuit so that the second pump tends to draw fluid into the cooling circuit from the heating circuit.

The cooling means may be an externally cooled heat exchanger, for example of the type in which an external flow of cold fluid passes over one or more conduits which form part of the cooling circuit and by so doing takes heat out of the fluid in the cooling circuit; by having a cooler of this type the external flow of cold fluid to the cooling means may be controlled by third valve means which third valve means is arranged to be actuated to permit the external flow of cold fluid to the cooling means when the second control means is at its maximum temperature operative condition. Alternatively the cooling means may be provided by fluid injection means which is responsive to the second control means when the latter is at its maximum temperature operative condition so that the fluid injection means allows cold fluid from an external source to pass into the cooling circuit and simultaneously allows the excess volume of fluid in the cooling circuit to pass to a drain until the temperature of fluid in the cooling circuit is decreased to within the range determined by the second control means.

Devices which are responsive to fluid temperature and provide the aforementioned first and second control means having maximum and minimum temperature operative conditions are well known in the art of temperature control systems. Such devices may be of a kind which comprise a moving element contact the position of which varies in response to temperature variations of the fluid and a pair of relatively stationary (but usually adjustable in position) contacts which respectively correspond to the maximum and minimum temperature operative conditions required of the device; if the position of the moving element contact varies sufficiently for it to engage either of the stationary contacts then the device emits an appropriate signal to actuate a further part of the system as required. Usually, in control devices of this kind, the maximum and minimum operative conditions during which the above mentioned valve means, heating means or cooling means are actuated as appropriate will have a predetermined temperature tolerance. For example, if the first control means responds to a minimum temperature operative condition the heating means will be actuated until the fluid temperature in the heating circuit is above such minimum temperature by a predetermined amount, and if the second control means responds to a maximum temperature operative condition the cooling means will be actuated until the fluid temperature in the cooling circuit is below such maximum temperature by a predetermined amount.

The term "fluid" as used throughout this specification is intended to mean a liquid, a vapour or a gas. If the fluid used in the system is substantially incompressible, such as oil or water (either of which is most likely to be used in the system) then a volume balance passage is provided and preferably such a passage is provided even if the fluid is compressible. Such balance passage continuously communicates between both circuits (desirably opening into the two circuits at positions having substantially the same fluid pressures) and allows fluid to pass through it from the heating or cooling circuit to the cooling or heating circuit respectively when appropriate valve means is actuated to transfer fluid through the appropriate transfer passage from the cooling or heating circuit to the heating or cooling circuit respectively; in this way a balance of fluid may be maintained in both circuits. Advantageously the volume balance passage opens into the heating circuit on the input side of the first pump and opens into the cooling circuit on the input side of the second pump.

One embodiment of a temperature control system constructed in accordance with the present invention will now be described, by way of example only, with reference to the accompanying diagrammatic drawing.

The temperature control system illustrated comprises first and second centrifugal pumps 1 and 2 which are conveniently driven by a common shaft 3 from a motor 4. Conveniently the two pumps have a common housing 5.

The pump 1 forms part of, and pumps fluid (which in the present example will be considered as water) through, a heating circuit comprising an electric heater 6, temperature control means 7 and a load 8. The pump 2 forms part of, and pumps water through, a cooling circuit comprising a cooler 9, second temperature control means 10 and a second load 11. Communicating between the input side of the pump 1 and the output side of cooler 9 is a first transfer passage 12 located in which is a normally closed first solenoid valve 13. Communicating between the output side of the heater 6 and the input side of pump 2 is a second transfer passage 14 located in which is a normally closed second solenoid valve 15. Communicating between the input sides of pumps 1 and 2 is a water volume balance passage 16 and cold water from an inlet 17 is passed through a non-return valve 18 into the volume balance passage 16 to fill both the heating and cooling circuits.

The cooler 9 comprises a chamber through which the water in the cooling circuit flows and mounted in the chamber are an array of tubes (not shown) through which cold water from the inlet 17 is passed by way of a passage 19 to a drain 20. Located in the passage 19 is a normally closed third solenoid valve 21.

The temperature control device 7 has a movable element contact 7c which moves in response to variations in temperature of water which passes from the heater 6 in the heating circuit and also has a minimum temperature contact 7a and a maximum temperature contact 7b, both of which are adjustable and correspond to operative conditions of the device 7. The device 7 is so arranged that when the water temperature is such that its contact 7c engages contact 7a the heater 6 is energised (through the indicated control line 22) and when contact 7c engages contact 7b the solenoid of valve 13 is energised (through the indicated control line 23) to open transfer passage 12. Similarly the temperature control device 10 has a movable element contact 10c which moves in response to variations in temperature of water which passes from the cooler 9 in the cooling circuit and also has minimum and maximum temperature contacts 10a and 10b respectively, both of which are adjustable and correspond to operative conditions of the device 10. When the temperature of water in the cooling circuit is such that the contact 10c engages contact 10a the solenoid of valve 15 is energised (through the indicated control line 24) to open transfer passage 14 and when contact 10c engages contact 10b the solenoid of valve 21 is energised (through the indicated control line 25) to open passage 19.

We will now consider use of the system assuming that the loads 8 and 11 are separate mould halves of a plastics injection moulding machine and that mould half 8 is to be heated to a higher temperature than that of mould half 11. The maximum and minimum temperature contacts of the temperature control devices 7 and 10 are adjusted to provide the respective ranges of temperature values required of the water in the respective circuits, the system is filled with water from inlet 17 as above mentioned and the pumps 1 and 2 are operated. Assuming that the water is initially at a temperature less than the minimum set at contacts 7a and 10a, then the heater 6 is energised and valve 15 is opened. The temperature of water in the heating circuit increases and some of this water is drawn through transfer passage 14 into the cooling circuit to increase the temperature of water therein while the water volume balance between the heating and cooling circuits is maintained through passage 16. When the water temperature in the cooling circuit is higher than the minimum temperature set for contact 10a of device 10, the valve 15 closes while the pump 2 continues to circulate water through die half 11 at a temperature within the predetermined range for that die half. Similarly when the water temperature in the heating circuit is higher than the minimum temperature set for contact 7a of device 7, the heater 6 is de-energised and the pump 1 continues to circulate water through the die half 8 at a temperature within the predetermined range for that die half.

Should the die half 11 become cooled during use so that the water temperature in its circuit drops sufficiently for the movable contact 10c to engage contact 10a, the valve 15 is caused to open and permits relatively hotter water to pass from the heating circuit into the cooling circuit until the valve 15 again closes. In this way the die half 11 may be maintained in the desired temperature range by flow of hot water from the heating circuit. Should the water temperature in the heating circuit fall below the minimum temperature set for contact 7a (either as a result of the load 8 being externally cooled or as a result of hot water from the heating circuit being transferred into the cooling circuit) the heater 6 is energised to bring the water in the heating circuit up to its required temperature.

During use of the two mould halves 8 and 11 with hot plastics material, the heat from the plastics material taken into the mould halves will tend to increase the temperature of the water in the two circuits. As a result, if the water temperature in the heating circuit increases sufficiently for the movable contact 7c to engage contact 7b of the temperature control device 7, the solenoid valve 13 is opened and relatively colder water from the cooling circuit is drawn by the pump 1, through the transfer passage 12 into the heating circuit - thereby reducing the water temperature in the heating circuit while a water volume balance is maintained between the two circuits through passage 16. If the water temperature in the cooling circuit increases (either as a result of the heat which is taken into the cooling circuit through the load 11 or as a result of the exchange of cold water from the cooling circuit for hot water from the heating circuit) sufficiently for the movable contact 10c to engage contact 10b of temperature control device 10, the cooler 9 is actuated by opening of the solenoid valve 21. This allows cold water from the inlet 17 to flow through the passage 19 to the coller and thereby reduce the water temperature in the cooling circuit until it falls below the maximum temperature set for contact 10b when the valve 21 will close.

From the aforegoing it will be apparent that if the water temperature in the heating circuit increases beyond a predetermined maximum, water from the cooling circuit is mixed therewith to maintain the temperature of the heating circuit water within its predetermined range while if the temperature of the cooling circuit water falls below a predetermined minimum then water from the heating circuit is mixed therewith to maintain the temperature of the cooling circuit water within its predetermined range.

It will be noted that the control system is substantially closed (the non-return valve 18 being only necessary to permit filling of the system initially and to provide for any "topping up" as may be necessary due to water leakage from the system) and the heating of both loads 8 and 11 can be achieved solely by the heat output from heater 6. However, should the cooler 9 become operative, and assuming that this does not result from any adjustment in the maximum or minimum temperature operative conditions of the control devices 7 and 10, the cooling which is effected by the system is primarily to counteract external heat which is applied to the system through the die halves 8 and 11. In this way it is believed that the system will provide efficient usage of heat energy which is passed from the heater 6 into the water of the circuits.

Each of the heating and cooling circuits includes two valves 26 located one on each side of the loads 8 and 11. By these valves 26 the loads may be isolated from the remaining part of the system, for example to facilitate the interchange of one pair of loads with another pair.

To accommodate for expansion of the water during heating, the system is provided with an expansion passage 27 which includes a pressure relief valve 28 and communicates between the fluid cooling circuit and the drain 20.

What we claim is:

1. A temperature control system which comprises a fluid heating circuit which includes a first load; said heating circuit having a first pump, fluid heating means and first control means; said first control means being responsive to the temperature of fluid in the heating circuit having predetermined maximum and minimum temperature operative conditions, said first control means being operatively connected to the heating means to actuate the heating means at its minimum temperature operative condition; a fluid cooling circuit which includes a second load; said cooling circuit having a second pump, fluid cooling means and second control means; said second control means being responsive to the temperature of fluid in the cooling circuit and having predetermined maximum and minimum temperature operative conditions, said second control means being operatively connected to the cooling means to actuate the cooling means at its maximum temperature operative condition; and wherein the first control means, when at its maximum temperature operative condition, is arranged to actuate normally closed first valve means which when actuated allows fluid to flow from the cooling circuit into the heating circuit, and the second control means, when at its minimum temperature operative condition is arranged to actuate normally closed second valve means which when actuated allows fluid to flow from the heating circuit into the cooling circuit.

2. A temperature control system as claimed in claim 1 wherein the first valve means is located in a first transfer passage which, when the first valve means is actuated communicates between a position of low fluid pressure in the heating circuit and a position of relatively higher fluid pressure in the cooling circuit, and in which the second valve means is located in a second fluid transfer passage which, when the second valve means is actuated, communicates between a position of low fluid pressure in the cooling circuit and a position of relatively higher fluid pressure in the heating circuit.

3. A temperature control system as claimed in claim 2 wherein, when the first valve means is actuated, the first transfer passage communicates between the input side of the first pump in the heating circuit and the output side of the cooling means.

4. A temperature control system as claimed in claim 2 wherein, when the second valve means is actuated, the second transfer passage communicates between the output side of the heating means and the input side of the second pump in the cooling circuit.

5. A temperature control system as claimed in claim 1 wherein the first and second valve means comprise electrically actuated solenoid valves.

6. A temperature control system as claimed in claim 1 wherein the cooling means comprises, or is adapted to comprise, a flow of cold fluid from an external source over a heat exchange part of the cooling circuit, said flow of cold fluid being controlled by normally closed third valve means which is arranged to be actuated to permit such flow when the second control means is at its maximum temperature operative condition.

7. A temperature control system as claimed in claim 6 wherein the third valve means comprises an electrically actuated solenoid valve.

8. A temperature control system as claimed in claim 1 wherein the cooling means comprises fluid injection means which is responsive to the second control means when the latter is at its maximum temperature operative condition and is so arranged that at such condition cold fluid from an external source is passed into the cooling circuit while the excess volume of fluid in the cooling circuit is drawn off until the temperature of fluid in the cooling circuit is decreased to within the range determined by the second control means.

9. A temperature control system as claimed in claim 1 wherein a volume balance passage continuously communicates between the heating and cooling circuits for maintaining a balance of the fluids in the two circuits when fluid from either one of the heating or cooling circuits flows into the other circuit by way of the first or the second valve means.

10. A temperature control system as claimed in claim 9 wherein the volume balance passage opens into the two circuits at positions having substantially the same fluid pressures.

11. A temperature control system as claimed in claim 10 wherein the volume balance passage opens into the heating circuit on the input side of the first pump and opens into the cooling circuit on the input side of the second pump.

* * * * *